United States Patent Office 3,647,887
Patented Mar. 7, 1972

3,647,887
ARYL-SUBSTITUTED POLYFLUORO-ALKOXYALKANES
Louis G. Anello, Orchard Park, and Richard F. Sweeney, Elma, N.Y., and Morton H. Litt, Cleveland, Ohio, assignors to Allied Chemical Corporation, New York, N.Y.
No Drawing. Continuation-in-part of application Ser. No. 633,359, Apr. 25, 1967. This application May 25, 1970, Ser. No. 40,431
Int. Cl. C07c 43/00
U.S. Cl. 260—611 A                40 Claims

ABSTRACT OF THE DISCLOSURE

Novel telomers of the formula

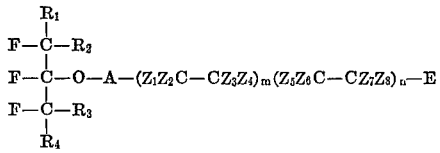

wherein $R_1$–$R_4$ are each F, Cl, H, alkyl ar haloalkyl groups, or when taken together, are alkylene or haloalkylene groups forming a cycloaliphatic structure, which $R_1$–$R_4$ groups may each have from 1 to 9 carbon atoms and which halogen atoms, if any, have an atomic weight not exceeding about 79.92, with the proviso that no more than two of the four $R_1$–$R_4$ groups are alkyl groups, A is a member selected from the group consisting of radicals of the formulae

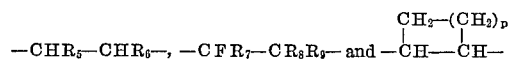

wherein $R_5$ and $R_6$ are independently selected from the group consisting of Cl, H and alkyl with the proviso that at least one of $R_5$ and $R_6$ is Cl; $R_7$ and $R_8$ are independently selected from the group consisting of F and H; $R_9$ is selected from the group consisting of F, H, Cl, Br and perfluoroalkyl; $p$ is an integer of from 1 to 9; with the proviso that when both $R_8$ and $R_9$ are F, $R_7$ is always F; $Z_1$–$Z_8$ may each be selected from the group consisting of H, F, Cl, Br, alkyl radicals having from 1–8 carbon atoms, haloalkyl radicals having from 1–8 carbon atoms in which haloalkyl radicals the halogen atoms have an atomic weight not exceeding about 79.92; phenyl radicals and substituted phenyl radicals selected from the group consisting of alkyl-substituted phenyl radicals having up to eight carbon atoms in the alkyl group, halo-substituted phenyl radicals, and haloalkyl-substituted phenyl radicals having up to eight carbon atoms in the alkyl group, or mixtures thereof, in which haloalkyl- or halo-substituted phenyl radicals the halogen atoms have an atomic weight not exceeding about 79.92, with the provisos that $Z_1$–$Z_8$ includes at least one phenyl or substituted phenyl radical and $Z_1$–$Z_8$ do not include more than two chlorine atoms and one bromine atom; $Z_1$ and $Z_3$ or $Z_5$ and $Z_8$ may be joined together to form a cycloaliphatic ring system; $m$ is an integer of from 1–75, $n$ is an integer of from 0–75, and E is halogen atom selected from the group consisting of I, Br and Cl with the proviso that if E is a bromine atom there may be no further bromine in the molecule.

These compounds are prepared by radical addition reaction of polyhaloisoalkoxyalkyl halide telogens of the formula

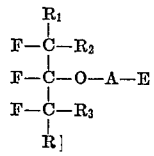

wherein $R_1$–$R_4$ are as defined above, or dissimilar lower molecular weight telomers, with telomerizable unsaturated compounds. The telomerization reaction may be initiated by heat or by means of a free-radical initiating catalyst. The telogen starting materials may be prepared by reacting a corresponding halogenated ketone with an ionizable fluoride salt, e.g. CsF, to form a fluorinated organic salt and then reacting the organic salt with a halogen other than fluorine and an olefin. After telomerization the telomers may be stabilized by replacing the E iodine or bromine atom with hydrogen or fluorine. The novel telomers are useful as insulator and condenser fluids, hydraulic fluids, lubricants, heat transfer media and as intermediates in the preparation of useful surfactants and polyacrylate oil and stain repellent agents.

CROSS-REFERENCES TO RELATED APPLICATIONS (1) This application is a continuation-in-part of copending application of Anello et al., entitled "Telomers and Process for the Preparation Thereof," Ser. No. 633,359, filed Apr. 25, 1967 now Patent No. 3,514,487.

(2) U.S. Patent 3,453,333 to Litt et al., entitled "Fluorinated Ethers," issued July 1, 1969.

(3) Copending application of Litt et al., entitled "Fluorinated Ethers," Ser. No. 513,574, filed Dec. 13, 1965 now Patent No. 3,470,254.

(4) Copending application of Anello and Sweeney, entitled "Novel Sulfates and Method for Their Preparation," Ser. No. 633,368, filed Apr. 25, 1967.

(5) Copending application of Anello et al., entitled "Novel Fluorinated Alcohols," Ser. No. 721,089, filed Apr. 12, 1968 and now abandoned.

(6) Copending application of Anello et al., entitled "Novel Fluorinated Acrylates and Polyacrylates," Ser. No. 721,114, filed Apr. 12, 1968, now Patent No. 3,547,861.

BACKGROUND OF THE INVENTION

This invention relates to novel radical addition reaction products of polyhaloisoalkoxy halides with unsaturated compounds having a phenyl, alkyl-substituted phenyl, halo-substituted phenyl or haloalkyl-substituted phenyl moiety.

Liquid low molecular weight polymers, generally known as telomers, prepared by reaction of a telogen and an unsaturated compound, particularly one containing a high proportion of fluorine, are known to be flame resistant and to have superior thermal and chemical stability. However, many potentially desirable fluorocarbon monomers polymerize only under extremely vigorous conditions while, with still others, it has been impossible to obtain any polymerization at all. It has been proposed to overcome this difficulty by copolymerizing difficultly polymerizable monomers with a second monomer known to polymerize more readily. In such copolymerization reactions, however, extraneous molecules are introduced into the polymer chain, so that all of the desirable properties of the homopolymer are not realized.

A further obstacle to preparation of telomers, particularly telomers containing a high proportion of fluorine, which are capable of being prepared by the telomerization reaction, i.e. by reaction of a telogen and an unsaturated compound, resides in the difficulty of controlling the chain length of the telomers produced by this method. The telomerization of fluorocarbon monomers such as tetrafluoroethylene and various derivatives thereof to low molecular weight telomer halides is extremely difficult as a result of the low activiation energy of the olefin propagation reaction in the telomerization reaction which is the primary route to higher molecular weight products. Accordingly, low molecular weight perfluoroalkyl iodide telogens, such as $CF_3I$, $C_2F_5I$ and n—$C_3F_7I$, which provide a high degree of thermal and chemical stability, must be used in extremely high molar ratios relative to the fluorocarbon monomer. This of necessity results in low conversions of the telogen to the desired telomer halide product. In addition, not only must large quantities of relatively expensive telogen be employed to produce a small quantity of desired telomer product but also tedious and expensive separatory procedures are involved in recovering the telomer product having the desired molecular weight range. Preparation of prior art telomers derived from polyfluoroalkyl halide telogens is disclosed in U.S. Pat. 3,083,238 to Hauptschein et al. and U.S. Pat. 3,145,222 to Brace.

SUMMARY OF THE INVENTION

It has been found that the telomerization of various unsaturated compounds, including fluorocarbon monomers hitherto considered difficult to polymerize, may be readily effected and the degree of control that may be exercised over the molecular weight of the telomer product is substantially improved provided that certain haloisoalkoxyalkyl halides are employed as telogens in the telomerization reaction. Furthermore, the haloisoalkoxyalkyl halides employed in production of the telomers of the present invention exhibit surprisingly reactive chain transfer properties thereby making it unnecessary to use a large excess of telogen in order to avoid the production of a large amount of relatively high molecular weight products of widely varying chain lengths. Moreover, as indicated above, the telomers so produced can be converted to materials having unusually superior surfactant properties or to materials having unusually superior oil, stain and water repellent properties.

The novel compounds produced in accordance with the present invention conform to the general formula:

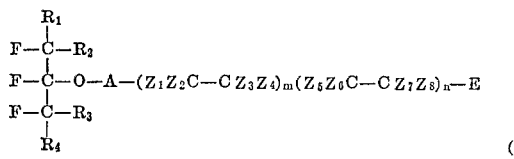

$$(I)$$

wherein $R_1$–$R_4$ are each F, Cl, H, alkyl or haloalkyl groups, or when taken together, are alkylene or haloalkylene groups forming a cycloaliphatic structure, which $R_1$–$R_4$ groups may each have from 1 to 9 carbon atoms and which halogen atoms, if any, have an atomic weight not exceeding about 79.92, with the proviso that no more than two of the four $R_1$–$R_4$ groups are alkyl groups; A is a member selected from the group consisting of radicals of the formulae

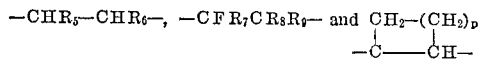

wherein $R_5$ and $R_6$ are independently selected from the group consisting of Cl, H and alkyl with the proviso that at least one of $R_5$ and $R_6$ is Cl; $R_7$ and $R_8$ are independently selected from the group consisting of F and H; $R_9$ is selected from the group consisting of F, H, Cl, Br and perfluoroalkyl; $p$ is an integer of from 1 to 9; with the proviso that when both $R_8$ and $R_9$ are F, $R_7$ is always F; $Z_1$–$Z_8$ may each be selected from the group consisting of H, F, Cl, Br, alkyl radicals having from 1–8 carbon atoms, haloalkyl radicals having from 1–8 carbon atoms in which haloalkyl radicals the halogen atoms have an atomic weight not exceeding about 79.92; phenyl radicals and substituted phenyl radicals selected from the group consisting of alkyl-substituted phenyl radicals having up to eight carbon atoms in the alkyl group, halo-substituted phenyl radicals, and haloalkyl - substituted phenyl radicals having up to eight carbon atoms in the alkyl group, or mixtures thereof, in which haloalkyl or halo-substituted phenyl radicals the halogen atoms have an atomic weight not exceeding about 79.92, with the provisos that $Z_1$–$Z_8$ includes at least one phenyl or substituted phenyl radical and $Z_1$–$Z_8$ do not include more than two chlorine atoms and one bromine atom; $Z_1$ and $Z_3$ or $Z_5$ and $Z_8$ may be joined together to form a cycloaliphatic ring system, $m$ is an integer of from 1–75, $n$ is an integer of from 0–75, and E is a halogen atom selected from the group consisting of I, Br and Cl with the proviso that if E is a bromine atom there may be no further bromine in the molecule.

The criticality in the molecule of these novel and valuable compounds is in the structure of the haloisoalkoxyalkyl portion of the molecule. This portion of the molecule is critically characterized by the presence of a carbon atom linking an oxygen atom and a fluorine atom, in combination with two haloalkyl linkages satisfying the remaining valences of the carbon atom linking the oxygen and fluorine atoms. The haloalkyl linkages are characterized by the presence of at least one fluorine atom on each carbon atom which is adjacent the carbon atom which links the oxygen and fluorine atoms. The haloalkyl linkages may, when taken together, form a cycloaliphatic structure. The term polyhaloisoalkoxyalkyl herein shall be understood as including such cycloaliphatic structures.

In the above Formula I, $R_1$–$R_4$ may be the same or different and may be H, F, Cl, or saturated straight-chain and branched-chain alkyl, haloalkyl, alkylene or haloalkylene groups of the type indicated.

There is no absolute criticality for the length of the carbon chain when the A group is substituted with an alkyl or perfluoroalkyl group. The only real limitation on the length of the carbon chains is solubility of the resulting products in applications for which solubility is necessary or desired. A preferred carbon content for such groups is from 1–6.

It has been found that telomers which possess such polyhaloisoalkoxyalkyl structures, in accordance with this invention, have particularly high reactivity and that such telomers can be converted to surface active agents with unusual activity. It has further been found that those telomers additionally possessing high fluorine contents, particularly those in which $R_1$–$R_4$ are F or perfluoroalkyl groups and in which the A moiety contains a high proportion of fluorine atoms, can be converted to polyacrylates having unusual activity as oil, stain and water repellent agents. For the purposes of this discussion, the term polyacrylate refers to methacrylate polymers as well as to acrylate polymers.

The portions of the telomer molecule defined by the bi-functional groups —$(Z_1Z_2C$—$CZ_3Z_4)_m$ and

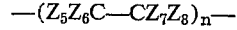

may be derived from any telomerizable olefinically unsaturated material. The prior art discloses a vast number of such telomerizable unsaturated materials. Exemplary listings may be found in U.S. Pat. 3,083,238 and U.S. Pat. 3,145,222, the disclosures of which in this regard are hereby incorporated by reference. When polyunsaturated materials are employed, addition or telomerization other than 1,2- is possible. For example, with butadiene, 1,4-addition or telomerization can take place.

At least one of $Z_1$–$Z_8$ must be a phenyl radical, an alkyl-substituted phenyl radical having up to eight carbon atoms in the alkyl group, a halo-substituted phenyl radical, or a haloalkyl-substituted phenyl radical having up to eight carbon atoms in the alkyl group, in which haloalkyl- or halo-substituted phenyl radicals the halogen atoms have an atomic weight not exceeding about 79.92 with the proviso that $Z_1$–$Z_8$ includes at least one phenyl or substituted phenyl radical. The phenyl radicals may be substituted with a plurality of alkyl or haloalkyl groups each containing up to eight carbon atoms.

The polyhaloisoalkoxyalkyl halide telogen employed in the preparation of the novel telomers of the present invention may be represented by the formula:

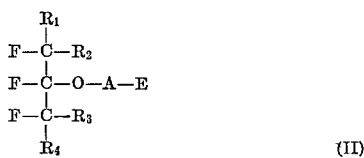

$$\begin{array}{c} R_1 \\ | \\ F-C-R_2 \\ | \\ F-C-O-A-E \\ | \\ F-C-R_3 \\ | \\ R_4 \end{array} \qquad (II)$$

wherein $R_1$–$R_4$ and A are as previously defined and wherein E is selected from the group consisting of iodine and bromine. When E is bromine there may not be any other bromine substitution in the molecule.

The telogen starting materials may be prepared by reaction of an appropriate halogenated ketone with an ionizable fluoride salt to form a fluorinated organic salt and then reacting the organic salt with a halogen other than fluorine (e.g. iodine, bromine) and an appropriate olefin to form the desired polyhaloisoalkoxyalkyl halide. The reactions are more fully described in U.S. Pat. 3,453,333 to Litt et al., entitled "Fluorinated Ethers," issued July 1, 1969 and copending application of Litt et al., Ser. No. 513,574, filed Dec. 13, 1965, the pertinent subject matter of which is hereby incorporated by reference. For example, as is described in Examples 1 and 3 of U.S. Pat. 3,453,333, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula $(CF_3)_2CFO-K^+$ and thereafter reacting this addition compound with tetrafluoroethylene and iodine in the presence of an inert organic solvent to form the desired perfluoroisopropoxyethyl iodide, $(CF_3)_2CFOCF_2CF_2I$.

Telomers according to the invention wherein $n$ is 0 may be obtained by telomerizing, at reaction conditions more particularly defined hereafter, a telogen of Formula II, as above described, with a telomerizable unsaturated compound as described herein. The telomerizable unsaturated compound may be the same or different from that used as reactant with the fluorinated organic salt and halogen in preparation of the telogen starting materials. When both $m$ and $n$ are 1 or over, the products thereby defined are obtained by reacting a suitable telogen with a first telomerizable unsaturated material to form a telomer and reacting the telomer thus produced with a second telomerizable unsaturated material which may be the same or different as the first telomerizable unsaturated material. The telomerizable unsaturated compound may not contain bromine if the E atom in the telogen is bromine.

As can be seen from the above description, the telomers produced can serve as telogens for further reactions. The term telogen will be used in this sense herein. In other words, the telogen may be a telomer product produced from a telogen, which telomer produced is further telomerizable.

In general, the reaction between the telogen and the telomerizable unsaturated compound is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150–200° C. Furthermore, although the reactoin may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the reaction may be conducted by use of a catalyst or light of sufficient intensity to initiate the free radical reaction. Illustrative free radical generating catalysts include azonitriles such as alpha, alpha′-azobisisobutyronitrile and organic peroxides such as benzoyl peroxide, acetyl peroxide and pelargonyl peroxide. The use of such initiators allows operation at a lower temperature but gives a somewhat more complex product mixture because of incorporation of catalyst fragments in the telomer mixture, or results in a higher molecular weight distribution in the product telomer.

The telomerization reaction may be carried out in various ways. For example, the telogen and the unsaturated compound may be introduced into an autoclave which is then sealed and heated, preferably with agitation such as by stirring or shaking, until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound: telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e. telomers containing up to about 6 or 7 monomer units per telomer molecule. On the other hand, in a constant pressure reaction, i.e. where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties. It is intended that the appended claims cover the individual telomers as well as mixtures thereof.

The physical properties of the telomer products obtained in accordance with the present invention are dependent upon the starting reactants and the size of the telomer product and accordingly the utility of the telomer product in general varies with these properties.

The lower telomers, i.e. where the sum of $m$ and $n$ is 1 and 2, are valuable as vapor phase coolants and dielectrics for electrical equipment and as temperature differential fluids in thermometric devices. In addition, lower telomer iodides wherein the sum of $m$ and $n$ is up to about 5 are especially useful, for example, in salves and ointments, as bactericidal and bacteristatic agents since these compounds will release iodine slowly when applied to a surface.

The telomers produced in accordance with the present invention in accordance with the above-described reaction in which the E atom is iodine or bromine may be converted to stabilized forms of telomers by replacing the iodine or bromine Q atom with a chlorine, fluorine or hydrogen atom. Such a replacement may be carried out by any conventional method. For example, telomer iodides or bromides as described herein, wherein $R_1$ and $R_2$ are F atoms or perfluoroalkyl groups and in which the A moiety is perfluorinated, may be reacted with elemental chlorine at a temperature from 20 to about 270° C. or reacted with a fluorinating agent such as $SbF_5$, $CoF_3$, elemental fluorine or KF in a polar solvent, at normal or elevated temperatures up to about 300° C. to form the corresponding telomer chloride or fluoride. Corresponding hydrogen replacement can be effected by reacting the telomer iodide or bromide with a mild reducing agent such as $LiAlH_4$ or with zinc and alcohol. In any event, the chlorinating, fluorinating or reducing agents and conditions chosen should be such as to enable carrying out the reaction without adverse effects on the molecule involved.

The telomers and particularly the stabilized telomers are useful as insulators and condenser fluids. The telomer products which are oily liquids are useful as hydraulic fluids or permanent lubricants for various instruments and their chemical and thermal stability renders them excellent heat transfer media and refrigerants.

As noted above, the telomers prepared in accordance with this invention are also useful as intermediates in the synthesis of surface active agents possessing unusually high surface active properties. These surface active agents may be prepared by converting the telomers to acid salts having surface active properties. Telomers in which the E atom is iodine or bromine and in which the carbon atom adjacent to the E atom is perhalogenated, may be converted to the corresponding acid salts by reacting such telomers with sulfur trioxide to form intermediate acid halides and pyrosulfuryl halides.

The reaction of the telomer with sulfur trioxide should be carried out at temperatures between about 50–175° C., preferably between about 100–150° C. The molar ratio of $SO_3$ to telomer should be at least about 1:1 but perferably a molar ratio of about 2:1 to 5:1 should be employed. A sufficient pressure should be employed to maintain the reactants in the liquid phase. Depending on the volatility of the particular telomer employed and the concentration of $SO_3$, suitable pressures may range from about 25–500 p.s.i.g.

The intermediate acid halides may then be hydrolyzed to the corresponding acid salts, with an aqueous base such as potassium hydroxide, sodium hydroxide and ammonium hydroxide. The intermediate acid halides and pyrosulfuryl halides may also be hydrolyzed to the corresponding acids by refluxing with water.

Telomers in which the E atom is iodine or bromine and in which the carbon atom adjacent to the E atom contains one or more hydrogen atoms, an alkyl group, haloalkylene group, phenyl group, alkyl substituted phenyl group, halo substituted phenyl group or haloalkyl substituted phenyl group, may be converted to the corresponding acids by converting them to Grignard reagents followed by reaction of the Grignard reagent with $CO_2$ to form the corresponding acids. The acids may then be converted to the acid salts by neutralization with an inorganic base.

Telomers in which the E atom is iodine or bromine and in which the carbon atom adjacent to the E atom contains two hydrogen atoms may be converted to the corresponding acids by reaction with $SO_3$ in a molar ratio of about 3–5 mols $SO_3$ to 1 mole of telomer, at temperatures in the range of about 30–70° C., to form the corresponding polysulfates, hydrolyzing the polysulfates with 35–50% $H_2SO_4$ at about 100° C. to form the corresponding alcohols and oxidizing the alcohols with a permanganate or dichromate solution to the corresponding acids. The acids may then be converted to the acid salts by neutralization with an inorganic base. Other methods for preparing acid salts of the telomers of the invention will be devised by those of ordinary skill in the art.

The acid salts derived from the telomers of the invention exhibit unusually high surface active properties and may be used in the manner in which surfactants are conventionally employed, such as in the preparation of emulsions and surface coatings and to increase wettability such as in the dyeing of textile fabrics.

Acids may be generated from the salts derived from the telomers of the invention by acidification in water solution.

The acids are useful as intermediates in the preparation of oil and stain repellent agents. The acids in turn may be converted to the corresponding acid salts by neutralization with an aqueous base such as potassium hydroxide, sodium hydroxide and ammonium hydroxide, or the acids may be converted to a corresponding acid fluoride, for example, by reaction with thionyl chloride followed by reaction with an alkali metal fluoride such as KF.

Telomers conforming to general Formula I, above described, wherein —$(Z_1Z_2C—Z_3Z_4)_m$— is a $$—(CF_2—CF_2)_m$$

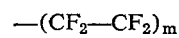

group wherein $m$ is 1 or more, —$(Z_5Z_6C—Z_7Z_8)_n$ is —$(CH_2—CH—Z_8)_n$ wherein $Z_8$ is a member selected from the group consisting of phenyl, alkyl-substituted phenyl, halo-substituted phenyl or haloalkyl-substituted phenyl, wherein $n$ is one or more, preferably 1, and wherein E is a bromine or iodine atom, are especially useful as intermediates in the synthesis of valuable polyacrylate stain repellents.

Telomers in which the carbon atom adjacent the E atom contains at least one hydrogen and wherein E is a bromine or iodine atom may be converted to the polyacrylates by contacting the telomers with sulfur trioxide to produce a polyfuoroalkylether polysulfate derivative which may then be heated with acrylic acid or methacrylic acid to produce the corresponding polyfluoroether acrylate monomer. The carylate monomer may then be subjected to emulsion polymerization in a conventional manner to produce the corresponding polyacrylate using an emulsifier, such as sodium lauryl sulfate and an initiator such as potassium persulfate. The reaction of the telomers with sulfur trioxide to produce the polyfluoroalkylether polysulfate intermediates may be carried out by reacting an appropriate telomer with at least about 1.5 moles of sulfur trioxide per mole of telomer reactant to obtain corresponding bis(polyhaloisoalkoxyalkyl) polysulfates. Generally, it is preferred to charge between about 2–10 moles of sulfur trioxide per mole of telomer reactant to produce intermediates readily convertible to the desired acrylate monomers. Reaction temperatures may vary between about 0–200° C. at atmospheric pressure and preferably shouuld be maintained between 15°–70° C. at atmospheric pressure in order to avoid undesirable side reactions. Sub- or superatmospheric pressures may also be employed. Liquid phase reaction is preferred. Preferably, temperatures and pressures should be adjuusted accordingly. The time required for the reaction is dependent upon the several process variables but generally varies from about 10 minutes to 100 hours, with usual reaction times for high yields being in the order of about 30 minutes to 15 hours. If desired, the reaction may be conducted in the presence of a solvent. Suitable solvents include, for example, sulfur dioxide and halogenated hydrocarbons such as 1,1,2-trifluorotrichloroethane and 1,1,1,3,4,4,4-heptafluoro - 2,2,3 - trichlorobutane. The polysulfate products may be recovered by conventional physical separatory procedures, e.g. fractional distillation or fractional crystallization. Preparation of the polysulfates is disclosed in more detail in copending application of Anello and Sweeney, entitled "Novel Sulfates and Methods for Their Preparation," Ser. No. 633,368, filed Apr. 25, 1967. The reaction of the polyfluoroalkylether polysulfate intermediates with the acrylic reactant is slightly exothermic but temperatures should be elevated to about 110° C. and maintained at that level for about 20 hours in order to obtain high yields of the sought-for acrylate monomers. The acrylate monomer can be purified by water washing, drying and fractional distillation. This route to acrylate monomers may be followed with any polysulfate obtained by reaction of a telomer as described herein with $SO_3$.

As indicated above, polymerization of the acrylate monomers may be accomplished by conventional methods. Temperatures for emulsion polymerization in the presence of a free radical initiator may conveniently be maintained at about 55° C. for a period from about 2–6 hours to give good yields of the corresponding polyacrylate. The acrylate monomers may be copolymerized by the same techniques for homopolymerization with a variety of comonomers such as N-methylol acrylamide and other acrylate monomers including dissimilar monomers derived from the telomers disclosed herein as well as conventional types of acrylate monomers, such as methyl methacrylate, methacrylic acid and 2-ethylhexyl acrylate. Other polymerizable vinyl compounds are suitable and will readily occur to those skilled in the art. Such copolymers as well as the homopolymers possess excellent oil and stain repellent properties, including high repellency to stain and durability to laundering, cleaning and wearing.

Polyacrylates are obtainable from the telomers described herein by another route. The telomers may be converted to polyhaloisoalkoxyfluoroalkanols of the formula:

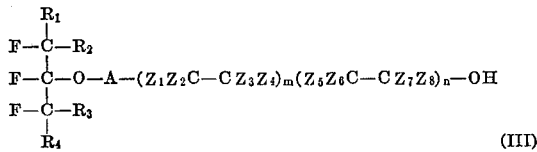

(III)

wherein $R_1$–$R_4$, A, $Z_1$–$Z_8$, m and n are as defined above, by various means. These alcohols are disclosed and claimed in copending application of Anello et al. entitled "Novel Fluorinated Alcohols," Ser. No. 721,089, filed Apr. 12, 1968, mentioned supra. The polyacrylates are disclosed and claimed in copending application of Anello et al. entitled "Novel Fluorinated Acrylates and Polyacrylates," Ser. No. 721,114, filed Apr. 12, 1968.

Telomers in which the E atom is iodine or bromine and in which the carbon atom adjacent to the E atom is perhalogenated, may be converted to the corresponding 1,1-dihydromethylene alcohols by reacting such telomers with $SO_3$, as described above, to produce the corresponding acid halides, reacting the acid halides with an alkanol, at temperatures in the range of about 0–25° C. to form the corresponding ester, followed by reduction of the ester with a mild reducing agent such as $LiAlH_4$ in ether to form the 1,1-dihydro alcohol.

Telomers in which the E atom is iodine or bromine and in which the carbon atom adjacent to the E atom contains one or more hydrogen atoms, an alkyl group, alkylene group, haloalkyl group, haloalkylene group, phenyl group, alkyl-substituted phenyl group, halo-substituted phenyl group or haloalkyl-substituted phenyl group, may be converted to the corresponding 1,1,-dihydromethylene alcohols by reacting such telomers with $SO_3$ as described above, to form the corresponding polysulfates, followed by hydrolysis of the polysulfate with 35–50% $H_2SO_4$, at about 100° C. to the 1,1-dihydromethylene alcohols.

Other means for preparing 1,1,-dihydromethylene alcohols from the telomers of the invention may be devised by those skilled in the art.

DESCRIPTION OF THE PREFERRED EMBODIMENTS

With reference to Formula I for the novel telomer products of the invention, $R_1$–$R_4$ are preferably Cl, F or perfluoroalkyl groups. If perfluoroalkyl groups, $R_1$–$R_4$ preferably contain 1–2 carbon atoms. When the $R_1$–$R_4$ groups are haloalkyl groups containing halogen substitution, it is preferred that enough fluorine substitution be provided so that the atomic ratio of fluorine to the other halogen atoms, to the hydrogen atoms or to the combined total of the other halogen atoms and hydrogen atoms, is at least 1:1.

Subject to the limitations described herein, the A moiety of the telomer products of Formula I is preferably a —$CFR_7$—$CR_8R_9$ group and, still preferably, is perfluorinated or monochloroperfluorinated. The preferred carbon content of the A moiety is from 1–6 carbon atoms. $p$ in the A group may be from 1–9 but is preferably from 1–3.

In the preferred embodiments E is iodine.

When $Z_1$–$Z_8$ in the above formula are alkyl or haloalkyl radicals, they may be straight-chain or branched-chain groups preferably containing up to 12 carbon atoms.

The phenyl group may be substituted with halogen, alkyl or haloalkyl groups, or any combination thereof. The alkyl or haloalkyl substituents may be straight-chain or branched-chain. In the preferred embodiment the phenyl group is unsubstituted, i.e. a —$C_6H_5$— group. In the following description, —$C_6H_4$— denotes the phenylene radical, —$C_6H_5$— denotes the phenyl radical, and

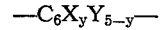

denotes a substituted phenyl radical.

Preferably the sum of $m$ and $n$ in the above formula is from 1–40, still preferably from 1–15 and most preferably from 1–7.

Illustrative telomerizable unsaturated compounds suitable for reaction with the polyhaloisoalkoxyalkyl halides of Formula II above include the following: $CF_2$=$CF_2$, $CF_2$=$CH_2$, $CCl_2$=$CH_2$, $CFH$=$CH_2$, $CClH$=$CH_2$, $$CH_2=CH_2$$

$CFH$=$CF_2$, $CFH$=$CFH$, $CClH$=$CClH$, $CF_2$=$CFCl$, $CF_2$=$CFBr$, $CF_3CF$=$CF_2$, $CF_2ClCF$=$CF_2$, $$CF_3CH=CF_2$$

$CF_2CCl$=$CF_2$, $(CF_3)_2C$=$CF_2$, $CF_3CF$=$CFCl$, $$CF_3CH=CFCL$$

$CFCl$=$CFCl$, $CF_3CF$=$CH_2$, $CF_2ClCF$=$CF_2$, $$CF_2BrCF=CF_2$$

$CF_3CF$=$CFCF_3$, $CF_2$=$CFCF$=$CF_2$, $$CFCl=CFCF=CF_2$$

$CF_2$=$CClCF$=$CF_2$, $CFCl$=$CFCF$=$CFCl$, $CF_2$=$CClCCl$=$CF_2$, $CF_2$=$CFCF$=$CF_2$, $$CHF=CFCF=CF_2$$

$CF_2$=$CHCH$=$CF_2$, $CHF$=$CFCFCl_2$, $CHF$=$CFCF_3$, $$CF_2=CF(CH_2)_6CH_3$$

$CF_2$=$CFCHClCH_3$, $CF_2$=$CF(CH_2)_6CH_3$, $CF_2$=$CHCF_2CH_3$, $CF_2$=$CHCF_2CH_2Cl$, $$CH_2CCF_3CF_2Br$$

$CF_2$=$C(CF_3)CF_2(C_3H_7)$, $CHCl$=$CFCF_3$, $$CH_2=CClCF_2CH_3,$$

$CF_2$=$C$=$CF_2$,

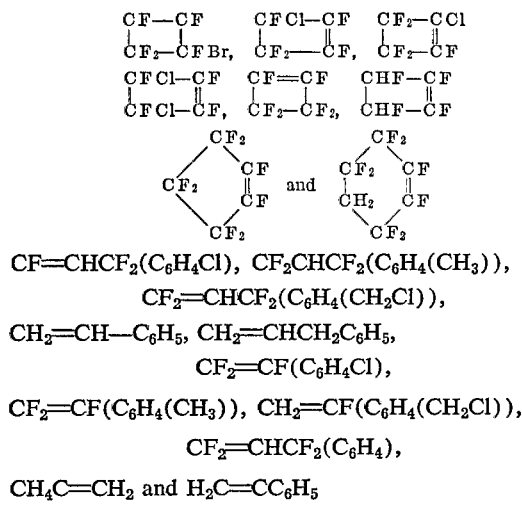

$CF=CHCF_2(C_6H_4Cl)$, $CF_2CHCF_2(C_6H_4(CH_3))$, $CF_2=CHCF_2(C_6H_4(CH_2Cl))$, $CH_2=CH-C_6H_5$, $CH_2=CHCH_2C_6H_5$, $CF_2=CF(C_6H_4Cl)$, $CF_2=CF(C_6H_4(CH_3))$, $CH_2=CF(C_6H_4(CH_2Cl))$, $CF_2=CHCF_2(C_6H_4)$, $CH_4C=CH_2$ and $H_2C=CC_6H_5$ A portion of this listing has been taken from the exemplary telomerizable unsaturated compounds listed in U.S. Patent 3,145,222.

The preferred telomerizable unsaturated olefins are $CF_2=CF_2$, $CH_2=CH_2$, $CClF=CF_2$, $CF_3-CF=CF_2$, $C_6H_5-CF=CF_2$, $C_6H_4Cl-CF=CF_2$ and $$C_6Cl_5-CF=CF_2$$

Specific examples of polyhaloisoaalkoxyalkyl halides within the scope of Formula II suitable for reaction with telomerizable unsaturated materials described above include the following:

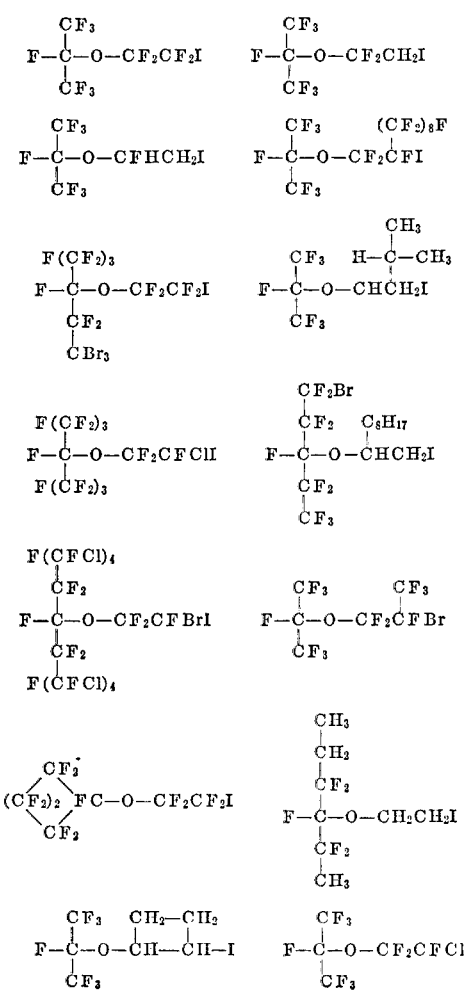

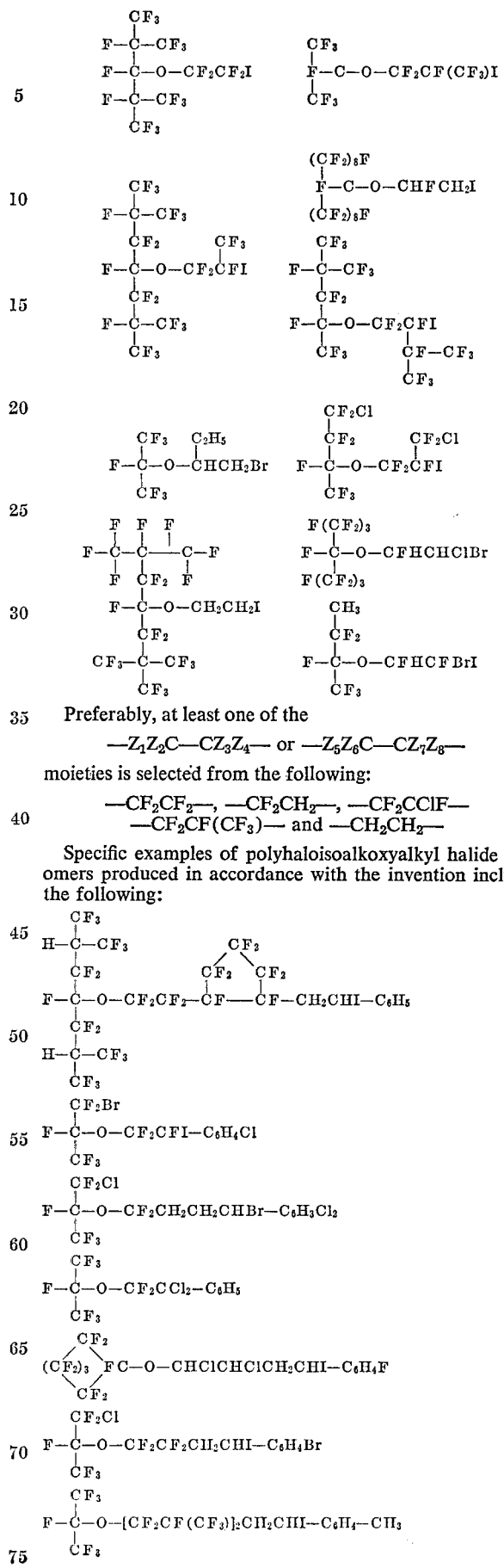

Preferably, at least one of the $-Z_1Z_2C-CZ_3Z_4-$ or $-Z_5Z_6C-CZ_7Z_8-$ moieties is selected from the following:

$-CF_2CF_2-$, $-CF_2CH_2-$, $-CF_2CClF-$
$-CF_2CF(CF_3)-$ and $-CH_2CH_2-$

Specific examples of polyhaloisoalkoxyalkyl halide telomers produced in accordance with the invention include the following:

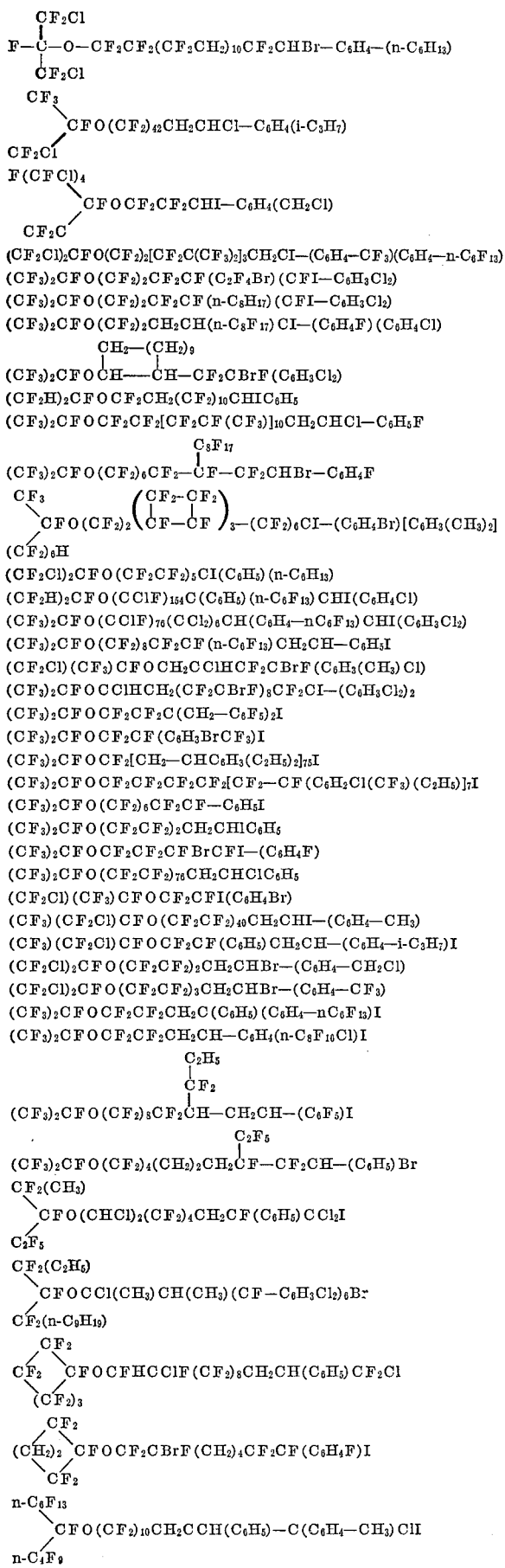

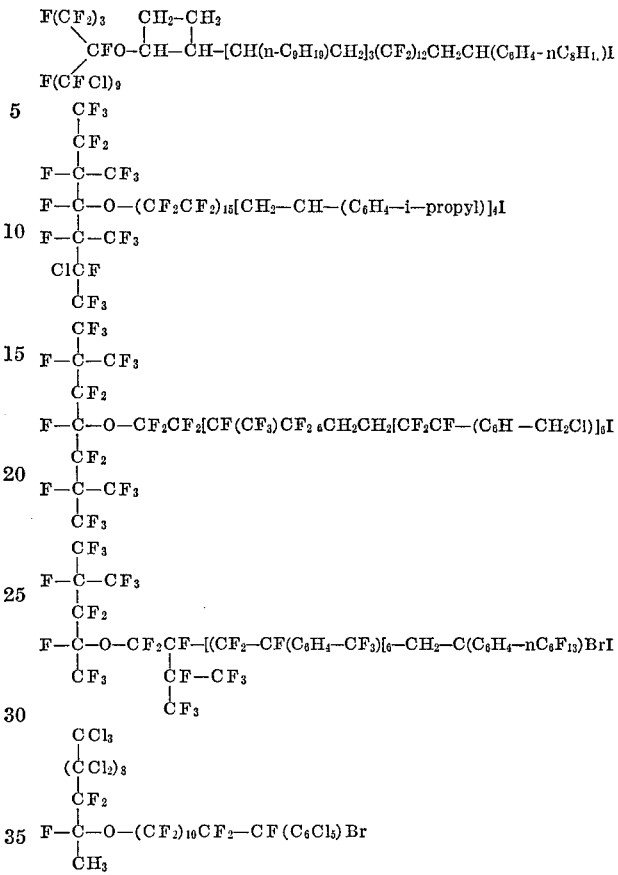

The following examples illustrate preparation and use of compounds of the invention. Parts and percentages are by weight unless otherwise indicated.

Example 1

A 300 ml. 3-necked flask is charged with 100 g. (0.24 mole) of $(CF_3)_2CFOCF_2CF_2I$, 12 g. (0.116 mole) of $CH_2=CH-C_6H_5$ and 0.3 g. of $\alpha,\alpha'$-azobisisobutyronitrile catalyst. The resulting mixture is heated to 60° C. and maintained at that temperature for a period of five (5) hours. During this period low boilers are stripped off under a vacuum of 15 mm. A telomer product is obtained having the structure:

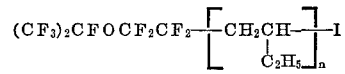

Vapor phase chromatography shows the product to consist of a mixture of compounds wherein $n=1$ and 2. The products were separated by fractional distillation to give the following:

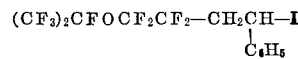

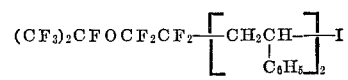

Example 2

A 300 ml. 3-necked flask is charged with 105 g. (0.17 mole) of $(CF_3)_2CFO(CF_2CF_2)_3I$, 20 g. (0.19 mole) of $CH_2=CH-C_6H_5$ and 0.5 g. of $\alpha,\alpha'$-azobisisobutyronitrile. The resulting mixture is heated to 60–80° C. and maintained at that temperature for a period of 20 hours. During this period low boilers are stripped off under a vacuum of 5 mm. A product is obtained having the structure:

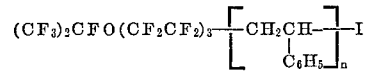

wherein n=1–6. The product mixture is fractionally distilled to yield the following products:

(1) $(CF_3)_2CFO(CF_2CF_2)_3-CH_2CH-I$
$|$
$C_6H_5$ (2) $(CF_3)_2CFO(CF_2CF_2)_3-[CH_2CH-]_2-I$
$|$
$C_6H_5$ (3) $(CF_3)_2CFO(CF_2CF_2)_3-[CH_2CH-]_3-I$
$|$
$C_6H_5$ (4) $(CF_3)_2CFO(CF_2CF_2)_3-[CH_2CH-]_4-I$
$|$
$C_6H_5$ (5) $(CF_3)_2CFO(CF_2CF_2)_3-[CH_2CH-]_5-I$
$|$
$C_6H_5$ (6) $(CF_3)_2CFO(CF_2CF_2)_3-[CH_2CH-]_6-I$
$|$
$C_6H_5$

Example 3

A flask was charged with 880 grams of 20% oleum. Then 1.0 mole of $(CF_3)_2CFOCF_2CF_2CH_2CHI-C_6H_5$ is added at 25° C. over a one hour period. The mixture is then further heated to 50° C. for ½ hour to complete formation of the hydrosulfate. The mixture is then added to 2,331 grams of water and the resulting mixture is heated to 82° C. for 16.5 hours to hydrolyze the hydrosulfate to the alcohol. The solution is filtered and about 0.23 mole of iodine is recovered. The filtrate is decolorized with 45 grams of $Na_2S_2O_5$ and the water-insoluble oil is separated, combined with methylene chloride extracts of the aqueous phase, dried and distilled. From the distillation products there is recovered $(CF_3)_2CFOCF_2CF_2CH_2CH(C_6H_5)OH$ and a small quantity of the starting iodine.

Example 4

In a 250 ml. 3-neck flask equipped with a stirrer, thermometer, reflux condenser and Dean-Stark tube are placed 0.2 mole of $(CF_3)_2CFOCF_2CF_2CH_2CH(C_6H_5)OH$, 0.2 mole of methacrylic acid, 0.7 gram of concentrated (96%) $H_2SO_4$, 2 grams of hydroquinone and 150 ml. of benzene. This mixture is heated with stirring to reflux. After about 6 hours, about 2.9 grams (0.16 mole) of water collects in the Dean-Stark tube and the remaining material is transferred to a distillation flask. The benzene is flashed off and there are recovered the methacrylate ester $(CF_3)_2CFOCF_2CF_2CH_2CH(C_6H_5)OCOC(CH_3)=CH_2$ and a small quantity of the starting alcohol.

Example 5

Into a 100 ml. 3-neck flask are placed 2.5 grams of $(CF_3)_2CFOCF_2CH_2CH_2CH(C_6H_5)OCOC(CH_3)=CH_2$ 20 grams deionized water, 1.17 grams of 30% $H_2O_2$ solution and 9 grams of an emulsifier (prepared by mixing 6 parts of cetyl dimethylamine, 2 parts of glacial acetic acid and 24 parts of water). The reaction flask is flushed with nitrogen. The temperature of the reaction mixture is raised to 55° C. and within four hours polymerization takes place yielding a stable emulsion of polymer.

The polyacrylate and polymethacrylate materials which may be prepared from the iodide starting materials of the invention as described in the above examples, may be readily applied to substrates for the purpose of imparting oil, stain and water repellency properties thereto, by any of the techniques well known to the art. For example, when the polymeric materials are prepared by bulk or suspension polymerization techniques, these materials may be applied directly from solution in a suitable organic solvent. The organic solvent may be that which has been employed in the polymerization reaction. If the polymeric materials have been obtained as an aqueous emulsion, the coating may be applied by diluting the emulsion obtained from the polymerization reaction with water or other solvent to obtain a dispersion of polymer solids which can then be used to apply the coating to the desired substrate. The optimum solids content of the dispersion or solution of the polymer employed will vary depending upon the particular material involved, the particular substrate involved and other factors. Such determinations are within the skill of the art.

The polymer dispersion or solution may be applied as a coating to the desired substrate by conventional techniques such as by spraying, brushing or dipping procedures. The coated materials can then be dried to remove the water or other solvent dispersing medium.

The polymeric materials may be used to impart oil, stain and water repellent properties to a variety of porous materials such as textiles, fibers, fabrics of natural or synthetic origin, e.g. cotton cloth or nylon, as well as to a variety of non-porous substrates, such as paper, wood, metal and the like.

The polymeric materials are described in more detail in copending application Ser. No. 721,114, mentioned supra.

We claim:
1. Compounds having the formula

$$\begin{array}{c} R_1 \\ | \\ F-C-R_2 \\ | \\ F-C-O-A-(Z_1Z_2C-CZ_3Z_4)_m(Z_5Z_6C-CZ_7Z_8)_n-E \\ | \\ F-O-R_3 \\ | \\ R_4 \end{array}$$

wherein
(a) $R_1-R_4$ are each F, Cl, H, alkyl or haloalkyl groups, or when taken together, are alkylene or haloalkylene groups forming a cycloaliphatic structure, which $R_1-R_4$ groups may each have 1 to 9 carbon atoms and which halogen atoms, if any, have an atomic weight not exceeding about 79.92 with the proviso that no more than two of the four $R_1-R_4$ groups are alkyl groups,
(b) A is a member selected from the group consisting of radicals of the formulae:

$-CHR_5-CHR_6-$ $-CFR_7-CR_8R_9-$ and $-\overset{CH_2-(CH_2)_p}{\underset{|\phantom{xx}|}{CH-CH-}}$ wherein $R_5$ and $R_6$ are independently selected from the group consisting of Cl, H and alkyl, with the proviso that at least one of $R_5$ and $R_6$ is Cl; $R_7$ and $R_8$ are independently selected from the group consisting of F and H; $R_9$ is selected from the group consisting of F, H, Cl, Br and perfluoroalkyl; $p$ is an integer of from 1 to 9; with the proviso that when both $R_8$ and $R_9$ are F, $R_7$ is always F,
(c) $Z_1-Z_8$ may each be selected from the group consisting of H, F, Cl, Br, alkyl radicals having from 1–8 carbon atoms, haloalkyl radicals having from 1–8 carbon atoms in which haloalkyl radicals the halogen atoms have an atomic weight not exceeding about 79.92; phenyl radicals and substituted phenyl radicals selected from the group consisting of alkyl-substituted phenyl radicals having up to eight carbon atoms in the alkyl group, halo-substituted phenyl radicals, and haloalkyl-substituted phenyl radicals having up to eight carbon atoms in the alkyl group, or mixtures thereof, in which haloalkyl or halo-substituted phenyl radicals the halogen atoms have an atomic weight not exceeding about 79.92, with the provisos that (1) $Z_1-Z_8$ includes at least one phenyl or substituted phenyl radical, (2) $Z_1-Z_8$ do not include more than two chlorine atoms and one bromine atom, (d) $Z_1$ and $Z_3$ or $Z_5$ and $Z_8$ may be joined together to form a cycloaliphatic ring system,
(e) $m$ is an integer of from 1–75,
(f) $n$ is an integer of from 0–75, and
(g) E is a halogen atom selected from the group consisting of I, Br and Cl with the proviso that if E is a bromine atom there may be no further bromine in the molecule.

2. Compounds as defined in claim 1 wherein A is a —$CFR_7$—$CR_8R_9$— moiety as defined in claim 1.

3. Compounds as defined in claim 1 wherein at least one member of the radical $Z_1$–$Z_8$ is a phenyl radical.

4. Compounds as defined in claim 1 wherein at least one member of the radical $Z_1$–$Z_8$ is an alkyl-substituted phenyl radical.

5. Compounds as defined in claim 1 wherein at least one member of the radical $Z_1$–$Z_8$ is a halo-substituted phenyl radical.

6. Compounds as defined in claim 1 wherein at least one member of the radical $Z_1$–$Z_8$ is a haloalkyl substituted phenyl radical.

7. Compounds as defined in claim 1 wherein $R_7$ is F.

8. Compounds as defined in claim 7 wherein $R_8$ is F.

9. Compounds as defined in claim 7 wherein $R_1$–$R_4$ are selected from Cl and F groups.

10. Compounds as defined in claim 8 wherein $R_1$–$R_4$ are each perfluoroalkyl groups.

11. Compounds as defined in claim 8 wherein $R_1$ is Cl and $R_2$–$R_4$ are F.

12. Compounds as defined in claim 8 wherein $R_1$–$R_4$ are each F.

13. Compounds as defined in claim 12 wherein the sum of $m$ and $n$ is from 1–40.

14. Compounds as defined in claim 12 wherein the sum of $m$ and $n$ is from 1–15.

15. Compounds as defined in claim 14 wherein E is Cl.

16. Compounds as defined in claim 14 wherein E is Br.

17. Compounds as defined in claim 14 wherein E is I.

18. Compounds as defined in claim 14 wherein $R_1$–$R_4$ are each F.

19. Compounds as defined in claim 14 wherein E is Cl.

20. Compounds as defined in claim 14 wherein E is Br.

21. Compounds as defined in claim 14 wherein E is I.

22. Compounds as defined in claim 12 wherein at least one of the —$Z_1Z_2C$—$CZ_3Z_4$— or —$Z_5Z_6C$—$CZ_7Z_8$— moieties are selected from the following: —$CF_2CF_2$—, —$CF_2CH_2$—, —$CF_2CClF$—, —$CF_2CF(CF_3)$—, and —$CH_2CH_2$—.

23. Compounds as defined in claim 22 wherein A is a —$CF_2CF_2$— group.

24. Compounds as defined in claim 23 wherein $Z_8$ is a phenyl radical.

25. Compounds as defined in claim 23 wherein $Z_8$ is an alkyl-substituted phenyl radical.

26. Compounds as defined in claim 23 wherein A is a halo-substituted phenyl radical.

27. Compounds as defined in claim 23 wherein A is a haloalkyl substituted phenyl radical.

28. Compounds as defined in claim 22 wherein the $(Z_1Z_2C$—$CZ_3Z_4)_m$ moiety is $(CF_2CF_2)_m$.

29. Compounds as defined in claim 22 wherein A is a —$CF_2CF_2$— group.

30. Compounds as defined in claim 22 wherein A is a —$CF_2ClF$— group.

31. Compounds as defined in claim 22 wherein A is a —$CF_2CF(CF_3)$— group.

32. Compounds as defined in claim 22 wherein A is a —$CH_2CH_2$— group.

33. Compounds as defined in claim 28 wherein $Z_5$, $Z_6$ and $Z_7$ are each H and wherein $Z_8$ is a phenyl radical.

34. A compound as defined in claim 1 which is $$(CF_3)_2CFOCF_2CF_2CH_2CHI-C_6H_5$$

35. A compound as defined in claim 1 which is $(CF_3)_2CFO(CF_2CF_2)_3CH_2CHIC_6H_5$.

36. A compound as defined in claim 1 which is $$(CF_3)_2CFOCF_2CF_2\left[-CH_2CH-\right]_2-I$$
$$\phantom{(CF_3)_2CFOCF_2CF_2[-CH_2}C_6H_5\phantom{-]_2-I}$$

37. A compound as defined in claim 1 which is $$(CF_3)_2CFO(CF_2CF_2)_3\left[-CH_2CH-\right]_3-I$$
$$\phantom{(CF_3)_2CFO(CF_2CF_2)_3[-CH_2}C_6H_5\phantom{-]_3-I}$$

38. A compound as defined in claim 1 which is $$(CF_3)_2CFO(CF_2CF_2)_3\left[-CH_2CH-\right]_4-I$$
$$\phantom{(CF_3)_2CFO(CF_2CF_2)_3[-CH_2}C_6H_5\phantom{-]_4-I}$$

39. A compound as defined in claim 1 which is $$(CF_3)_2CFO(CF_2CF_2)_3\left[-CH_2CH-\right]_5-I$$
$$\phantom{(CF_3)_2CFO(CF_2CF_2)_3[-CH_2}C_6H_5\phantom{-]_5-I}$$

40. A compound as defined in claim 1 which is $$(CF_3)_2CFO(CF_2CF_2)_3\left[-CH_2CH-\right]_6-I$$
$$\phantom{(CF_3)_2CFO(CF_2CF_2)_3[-CH_2}C_6H_5\phantom{-]_6-I}$$

References Cited
UNITED STATES PATENTS

| | | | |
|---|---|---|---|
| 3,453,078 | 3/1969 | Nychka et al. | 260—615 |
| 3,453,333 | 7/1968 | Litt et al. | 260—611 X |
| 3,514,487 | 5/1970 | Anello et al. | 260—611 |

HOWARD T. MARS, Primary Examiner

U.S. Cl. X.R.

106—2; 117—139.5, 145; 252—54, 65, 67, 77, 351; 260—86.1 R, 89.5 H, 408, 458, 526 R, 531 R, 535 H, 543 R, 544 F, 633, 999